United States Patent [19]

Baum et al.

[11] Patent Number: 4,775,608

[45] Date of Patent: Oct. 4, 1988

[54] GENERATION OF CAPACITIVE SERVO PATTERNS ON MAGNETIC STORAGE DISKS

[75] Inventors: Thomas H. Baum, San Jose; Phillip J. Brock, Sunnyvale; James Economy, San Jose; Robert L. Jackson, San Jose; Carl E. Larson, San Jose; James R. Lyerla, Jr., San Jose; Christopher R. Moylan, San Jose, all of Calif.

[73] Assignee: International Business Machines Corporation, Armonk, N.Y.

[21] Appl. No.: 104,476

[22] Filed: Oct. 5, 1987

[51] Int. Cl.$^4$ .............................................. G03C 5/00
[52] U.S. Cl. .................................... 430/320; 430/321; 430/417
[58] Field of Search ..................... 430/417, 320, 321

[56] References Cited

U.S. PATENT DOCUMENTS

| | | | |
|---|---|---|---|
| 3,562,005 | 2/1971 | De Angelo et al. | 430/315 |
| 3,656,952 | 4/1972 | Miller | 430/417 |
| 3,791,340 | 2/1974 | Ferrara | 430/417 |
| 3,993,802 | 11/1976 | Pollchette et al. | 427/98 |
| 4,239,789 | 12/1980 | Blum et al. | 427/53.1 |
| 4,526,807 | 7/1985 | Auerbach | 427/53.1 |
| 4,574,095 | 3/1986 | Baum et al. | 427/53.1 |
| 4,615,969 | 10/1986 | Strand | 430/324 |
| 4,618,568 | 10/1986 | Gemmler | 430/417 |

*Primary Examiner*—Paul R. Michl
*Assistant Examiner*—Patrick A. Doody
*Attorney, Agent, or Firm*—Joseph G. Walsh

[57] ABSTRACT

A process for generating a capacitive servo pattern on a magnetic storage disk, comprising the steps of: (1) coating the disk with a solution of noble metal compound to form a film of the compound on the disk, (2) exposing said film to radiation through a mask to generate an image on the film, and (3) plating the disk on the areas exposed to radiation.

4 Claims, No Drawings

GENERATION OF CAPACITIVE SERVO PATTERNS ON MAGNETIC STORAGE DISKS

DESCRIPTION

1. Technical Field

The present invention deals with a process for generating a capacitive servo pattern on a magnetic storage disk.

2. Background of the Art

Capacitive servoing is used to control tracking of magnetic storage device heads over disks. In this method, an electrically conducting layer, printed in the desired pattern on a disk, serves as one plate of a capacitor, with the head acting as the other plate. The height and lateral motion of the head with respect to the disk surface are adjusted by a servo loop, designed to maintain constant capacitance between the head and the conducting layer on the disk. This method of servo control requires that a very thin conducting layer be deposited on the disk surface in the desired pattern. The conventional process for producing this pattern is very involved. It calls for sputtering of a layer of metal over the entire disk, coating the disk with photoresist, exposing and developing the resist, etching away the metal film from the areas uncovered in resist-development, stripping the resist in a solvent, and oxygen plasma ashing to ensure that all resist is removed from the disk surface.

U.S. Pat. No. 3,993,802 shows the use of light to deposit metal on a substrate, for example, to make a printed circuit.

U.S. Pat. No. 4,239,789 shows a process for high resolution maskless electroless plating.

U.S. Pat. No. 4,526,807 shows deposition of metals in the form of conducting lines, by coating a substrate with a solution of a reducible metal in an oxidizable organic matrix and contacting the coated substrate with a beam of localized radiation.

U.S. Pat. No. 4,574,095 shows selective deposition of copper by first selectively depositing palladium seeds by irradiating a palladium compound with light.

U.S. Pat. No. 4,618,568 shows a chemical metallization process using radiation sensitive chromium complex.

None of the above art deals in any way with the problem solved by the present invention, namely making a capacitive servo pattern on a magnetic storage disk.

DISCLOSURE OF THE INVENTION

The present invention is a method for producing the desired metal pattern without sputtering and without using a resist, shortening the process to only three steps. In the process of the present invention, the disk is coated by spin-coating or spraying with a solution of a noble metal compound, such as a compound of gold, platinum, copper, or silver. This compound is selected so that it is capable of being spin-coated to give a uniform, extremely thin (~30 Angstroms) non-crystalline film after evaporation of the solvent and so that it is capable of being decomposed photochemically to produce the noble metal in some degree of purity. Subsequent exposure of the coated disk to light through a mask generates a very thin image, consisting of the noble metal and other photoproducts, while the unexposed areas have only the original compound. By immersion of the disk into an electroless metal plating bath, such as baths for plating copper, silver, or gold, the noble metal image is developed into a thicker plated pattern, since noble metals are active catalysts for electroless metal plating. Plating does not occur in the unexposed areas, since the unreacted noble metal compound is not an active catalyst. In a typical plating bath, the desired image thickness can be plated in 30–120 seconds. Electrolessly-plated metals can be produced in high purity and show no more tendency toward corrosion than metals deposited by sputtering or evaporation. The only other property required of the plated metal is that it be non-ferromagnetic, since the metal pattern must not interfere with the reading or writing of information within the magnetic storage medium. Copper, silver, and gold fulfill this requirement. The only limitation placed on the plated image is that it have a width-/height ratio>10 to prevent spreading of the pattern beyond the desired dimensions during plating. In typical disk servo patterns, this ratio is 85–120. When it proves desirable, the disk may be rinsed after plating to remove the thin layer of unreacted noble metal compound from the disk surface after plating. A pre-cleaning step is undoubtedly part of the process for deposition of the next layer on the disk, however, so a separate rinse step is unnecessary. In summary, the process of the present invention comprises three steps: (1) spin coating the disk with a solution of a noble metal compound; (2) exposing the disk to light through a mask, and (3) plating the disk in an electroless metal plating bath.

The process of the present invention provides a number of advantages over the traditional approach for producing disk servo patterns by sputtering and wet-etch patterning. Since no photoresist is required, the number of process steps is reduced considerably. Especially important is elimination of the oxygen plasma ashing step required to remove resist residue. There is no need to place the disks in vacuum for sputter-coating of the metal layer, saving additional processing time and difficulty. Uniform plating of thin metal layers is much easier than uniform sputtering over the large diameter disk substrate, ensuring a more uniform servo pattern. Also, deposition of a gold servo pattern, which is desirable because of gold's excellent corrosion resistance, would be undesirable by the traditional method, since sputter coating is inherently non-selective and since over half of the gold coating deposited on the disk must be removed in the wet-etch process to create the desired pattern. A tremendous quantity of gold would thus be lost, or extra steps would be necessary to recover the gold deposited on the sputtering chamber walls as well as the gold removed in the etch steps. The present invention, however, can produce a gold pattern with perfect selectivity and with no loss of gold in etching steps.

In a preferred variation of the invention, the copper plated pattern is gold-plated by immersion in an electroless gold plating bath for a short time, say less than one minute. The extra coating of gold protects the pattern against oxidation and helps produce an acceptable capacitive signal.

The following Examples are given solely for purposes of illustration and should not be thought as a limitation on the present invention, many variations of which are possible without departing from the spirit or scope thereof.

EXAMPLE I

A disk was spin-coated at 2000 rpm with a 1% by weight solution of dimethyl-(1,3-diphenyl-1,3-propandionato) gold (III) in methyl ethyl ketone. No residue was visible on the disk after coating by optical or electron microscopy, indicating that the gold compound forms a uniform, thin, non-crystalline coating. The disk was then exposed through a chromium-on-glass mask (contact mode) using a standard photolithography exposure station employing a mercury arc lamp with output through glass at 334, 365, 405, and 436 nm. After exposure, the disk was placed into a commercial electroless copper plating bath (Dynaplate 835) for 60 seconds. The 30 μm wide line and space servo pattern was accurately produced on the disk at a uniform thickness of ~350 Angstroms. The disk servo pattern produced by this method was found to be electrically conducting by four-point probe measurements (Rho=8.5 μΩ-cm). In repeated experiments, the thickness of the plated-copper image was found to be reproducible at a given exposure dose and plating time.

EXAMPLE II

The process of Example I was repeated, with the following changes and additions. The dimethyl-(1,3-diphenyl-1,3-propandionato) gold III was dissolved in a mixture of acetone and tetrahydrofuran. The irradiation was 10J/cm$^2$ at 365 nm. Plating with copper was in an electroless copper solution at room temperature for two minutes, followed by immersing the substrate in an electroless gold plating bath at 81° C. for one minute (maximum).

We claim:

1. A process for generating a capacitive servo pattern on a magnetic storage disk, said process comprising the steps of:
    (1) coating said disk with a solution of dimethyl-(1,3-diphenyl-1,3-propandionate) gold (III) to form a film of said compound on the disk;
    (2) exposing said film to radiation through a mask to generate an image on the film; and
    (3) plating the disk on the areas exposed to radiation.

2. A process as claimed in claim 1 wherein the plating is with copper in an electroless plating bath.

3. A process as claimed in claim 2 wherein the copper plating is followed by electroless gold plating.

4. A process for generating a capacitive servo pattern on a magnetic storage disk, said process comprising the steps of:
    (1) spin coating said disk with a solution of dimethyl-(1,3-diphenyl-1,3-propandionato) gold (III) to form a film of dimethyl-(1,3-diphenyl-1,3-propandionato) gold (III) on the disk;
    (2) exposing said film to light through a mask to generate an image on the film; and
    (3) plating the disk with copper in an electroless plating bath.

* * * * *